United States Patent
Dlala et al.

(10) Patent No.: US 10,797,562 B2
(45) Date of Patent: Oct. 6, 2020

(54) HIGH TORQUE AND POWER DENSITY DRIVE SYSTEM WITH SHORTENED OVERALL WIDTH

(71) Applicant: Atieva, Inc., Newark, CA (US)

(72) Inventors: Emad Dlala, Pleasanton, CA (US); Shun-Cheng Hung, Taipei (TW); Jeremy Mayer, Mountain View, CA (US); Balazs Palfai, Dublin, CA (US); Michael Tebbe, Redwood City, CA (US)

(73) Assignee: Atieva, Inc., Newark, CA (US)

( * ) Notice: Subject to any disclaimer, the term of this patent is extended or adjusted under 35 U.S.C. 154(b) by 226 days.

(21) Appl. No.: 16/181,612

(22) Filed: Nov. 6, 2018

(65) Prior Publication Data

US 2020/0127532 A1    Apr. 23, 2020

Related U.S. Application Data

(60) Provisional application No. 62/766,523, filed on Oct. 23, 2018.

(51) Int. Cl.
| | |
|---|---|
| *H02K 7/116* | (2006.01) |
| *F16H 1/46* | (2006.01) |
| *F16H 37/08* | (2006.01) |
| *F16H 48/08* | (2006.01) |
| *F16H 57/08* | (2006.01) |
| *H02K 1/27* | (2006.01) |
| *H02K 1/28* | (2006.01) |
| *H02K 7/00* | (2006.01) |
| *H02K 7/08* | (2006.01) |
| *H02K 21/14* | (2006.01) |
| *B60K 1/00* | (2006.01) |
| *B60K 17/04* | (2006.01) |
| *B60K 17/16* | (2006.01) |

(52) U.S. Cl.
CPC ............... *H02K 7/116* (2013.01); *F16H 1/46* (2013.01); *F16H 37/082* (2013.01); *F16H 48/08* (2013.01); *F16H 57/082* (2013.01); *H02K 1/276* (2013.01); *H02K 1/28* (2013.01); *H02K 7/006* (2013.01); *H02K 7/083* (2013.01); *H02K 21/14* (2013.01); *B60K 1/00* (2013.01); *B60K 17/046* (2013.01); *B60K 17/16* (2013.01); *B60K 2001/001* (2013.01)

(58) Field of Classification Search
CPC .. H02K 7/006; H02K 7/116; B60K 2001/001; B60K 17/046; B60K 17/16
See application file for complete search history.

(56) References Cited

U.S. PATENT DOCUMENTS

| | | |
|---|---|---|
| 2009/0026868 A1 | 1/2009 | Morgante |
| 2012/0129644 A1 | 5/2012 | Palfai et al. |
| 2016/0079817 A1 | 3/2016 | Hayashi et al. |

FOREIGN PATENT DOCUMENTS

JP    2010263761    11/2010

*Primary Examiner* — Ramon M Barrera
(74) *Attorney, Agent, or Firm* — Patent Law Office of David G. Beck

(57) ABSTRACT

A powertrain utilizing an active core motor with coaxially aligned planetary-differential-planetary gear assemblies is provided.

11 Claims, 5 Drawing Sheets

HIGH TORQUE AND POWER DENSITY DRIVE SYSTEM WITH SHORTENED OVERALL WIDTH

CROSS-REFERENCE TO RELATED APPLICATION

This application claims benefit of the filing date of U.S. Provisional Patent Application Ser. No. 62/766,523, filed 23 Oct. 2018, the disclosure of which is incorporated herein by reference for any and all purposes.

FIELD OF THE INVENTION

The present invention relates generally to electric motors and, more particularly, to a high power density electric vehicle powertrain that fits within a reduced envelope.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drivetrains into their vehicle line-ups. To meet consumer expectations, however, the automobile industry must not only achieve a greener drivetrain, but must do so while maintaining reasonable levels of performance, range, reliability, safety and cost.

The most common approach to achieving a low emission, high efficiency car is through the use of a hybrid drivetrain in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at a reduced level compared to a conventional vehicle. Additionally, due to the inclusion of both an internal combustion engine and an electric motor(s) with its accompanying battery pack, the drivetrain of a hybrid vehicle is typically more complex than that of either a conventional ICE-based vehicle or an all-electric vehicle, resulting in increased cost and weight. Accordingly, several vehicle manufacturers are designing vehicles that only utilize an electric motor, thereby eliminating one source of pollution while significantly reducing drivetrain complexity.

While a variety of hybrid and all-electric vehicles are known, a high power density powertrain that fits within a reduced envelope is desired in order to increase the available space for occupants, cargo, and other vehicle components/accessories. The present invention provides such an improved powertrain.

SUMMARY OF THE INVENTION

The present invention provides a powertrain assembly comprised of (i) an electric motor, (ii) a differential gear assembly mounted with the electric motor's hollow rotor, and (iii) a pair of planetary gear assemblies, each coaxially aligned with the hollow rotor. The rotor is attached directly to the rotor lamination stack, the rotor lamination stack containing a plurality of permanent magnets. The powertrain assembly is further comprised of first and second CV joint components, each of which includes a CV joint housing member. A first planetary gear carrier, corresponding to the first planetary gear assembly, is integral to the first CV joint component. A second planetary gear carrier, corresponding to the second planetary gear assembly, is integral to the second CV joint component.

The powertrain assembly may further include first and second CV joint carrier bearing assemblies, where the first CV joint housing member is located within a plane defined by the first CV joint carrier bearing assembly, and where the second CV joint housing member is located within a plane defined by the second CV joint carrier bearing assembly. The first planetary gear carrier may be comprised of a first plurality of planetary gear carrier members extending from a rear surface of the first CV joint housing member, and the second planetary gear carrier may be comprised of a second plurality of planetary gear carrier members extending from a rear surface of the second CV joint housing member.

The powertrain assembly may further include first and second rotor carrier bearings mounted mounting within first and second portions of the hollow rotor. The outer bearing race of the first rotor carrier bearing and the outer bearing race of the second rotor carrier bearing are each mounted to an inner rotor surface. The inner bearing race of the first rotor carrier bearing is mounted to a first powertrain assembly housing member that extends into the hollow rotor, and the inner bearing race of the second rotor carrier bearing is mounted to a second powertrain assembly housing member that extends into the hollow rotor.

The electric motor of the powertrain assembly further comprises a stator with a plurality of slots, where a plurality of windings occupy the plurality of stator slots, and where the plurality of windings may be comprised of stator wire with a rectangular cross-section.

The rotor lamination stack of the electric motor may be comprised of a plurality of lamination layers clamped together with a plurality of rivets. The rotor lamination stack may further include first and second rotor assembly end plates.

The another embodiment, a powertrain assembly is provided that is comprised of (i) an electric motor, (ii) a differential gear assembly mounted with the electric motor's hollow rotor, and (iii) a pair of planetary gear assemblies, each coaxially aligned with the hollow rotor. The rotor is attached directly to the rotor lamination stack, the rotor lamination stack containing a plurality of permanent magnets. The rotor is encircled by a stator containing a plurality of slots, where a plurality of windings occupy the slots, and where the windings are preferably comprised of stator wire with a rectangular cross-section. The powertrain assembly is further comprised of first and second CV joint components, each of which includes a CV joint housing member. A first plurality of planetary gear carrier members extend from the rear surface of the first CV joint housing member, the first plurality of planetary gear carrier members corresponding to the first planetary gear assembly. A second plurality of planetary gear carrier members extend from the rear surface of the second CV joint housing member, the second plurality of planetary gear carrier members corresponding to the second planetary gear assembly. The powertrain assembly is further comprised of first and second CV joint carrier bearing assemblies, where a portion of the first CV joint component is located within a plane defined by the first CV joint carrier bearing assembly, and where a portion of the second CV joint component is located within a plane defined by the second CV joint carrier bearing assembly. The powertrain assembly of this embodiment may further include first and second rotor carrier bearings mounted within first and second portions of the hollow rotor. The outer bearing race of the first rotor carrier bearing and the outer bearing race of the second rotor carrier bearing are each mounted to an inner rotor surface. The inner bearing race of the first rotor carrier bearing is mounted to a first powertrain assembly housing member that extends into the hollow rotor, and the inner bearing race of the second rotor carrier bearing is mounted to a second powertrain assembly housing member that extends into the hollow rotor. The rotor lamination stack of the electric motor may be comprised of a plurality of lamination layers interposed between first and second rotor assembly end plates and clamped together with a plurality of rivets.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation; similarly a first step could be termed a second step; similarly a first component could be termed a second component, all without departing from the scope of this disclosure.

Figure 1:
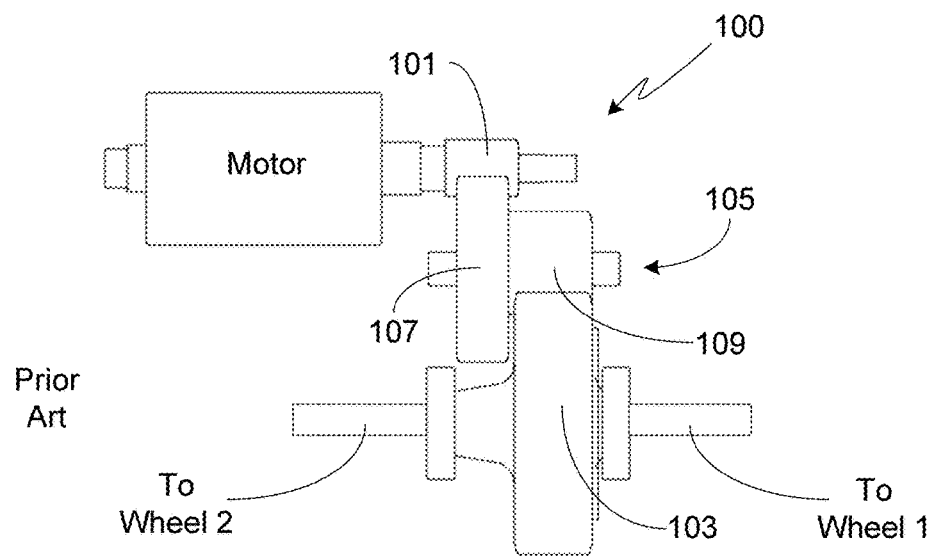
FIG. 1 provides a simplified side view of an electric vehicle powertrain in accordance with the prior art.

FIG. 1 provides a side view of a commonly employed electric vehicle powertrain 100. For purposes of clarity, this figure does not show gear teeth. As shown, input gear 101 is coupled to differential gear 103 via idler gear assembly 105. While this configuration is relatively straightforward to design and manufacture, it requires considerable volume. In order to reduce powertrain volume, a preferable configuration coaxially aligns the traction motor with the drive wheel axes. While this configuration is easily adapted to a rear wheel drive vehicle, its application to a front wheel drive vehicle is considerably more difficult given the volume constraints placed on the powertrain by the steering and suspension linkage assemblies.

While the powertrain configuration of a planetary-differential-planetary (i.e., a PDP configuration) is a known configuration, to date it has been used in low speed motor proportion designs. In this type of design there is a significant distance between the rotor lamination and the rotor shaft, resulting in a lower vehicle maximum speed. If one attempts to make up for the loss of top speed using a suitable gear reduction, then acceleration is reduced. The inventors of the present design have determined via extensive analyses that a high speed motor proportion design is preferable over a low speed motor proportion design in order to achieve a more favorable range of vehicle speeds while still maintaining adequate vehicle acceleration. Accordingly, the goal of the present invention is to configure a PDP powertrain assembly using a high speed motor proportion design, i.e., one in which the rotor lamination is directly connected to the rotor shaft, while still achieving a short overall width.

Figure 2:
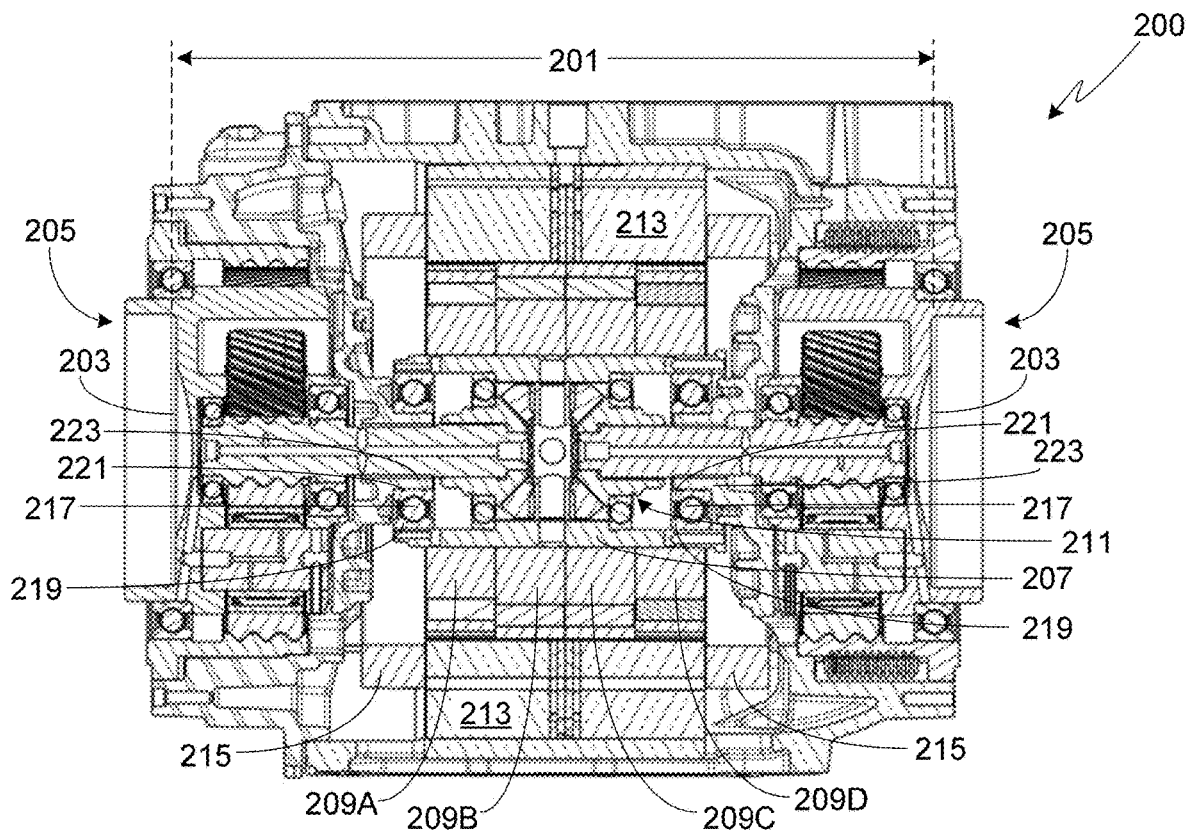
FIG. 2 provides a cross-sectional view of a powertrain assembly in accordance with the invention.

FIG. 2 provides a cross-sectional view of a powertrain assembly 200 designed in accordance with the invention, assembly 200 achieving a short overall width 201, where width 201 is measured between the bottom surfaces 203 of the two constant velocity (i.e., CV) joint components 205. As shown, the hollow rotor shaft 207 is directly connected to the rotor lamination stack in order to achieve the high speed motor proportion configuration as desired. Although not a requirement of the invention, in the preferred embodiment illustrated in FIG. 2 the lamination stack is comprised of four lamination layers 209A-209D. Contained within rotor shaft 207 is the differential gear assembly 211.

Figure 3:
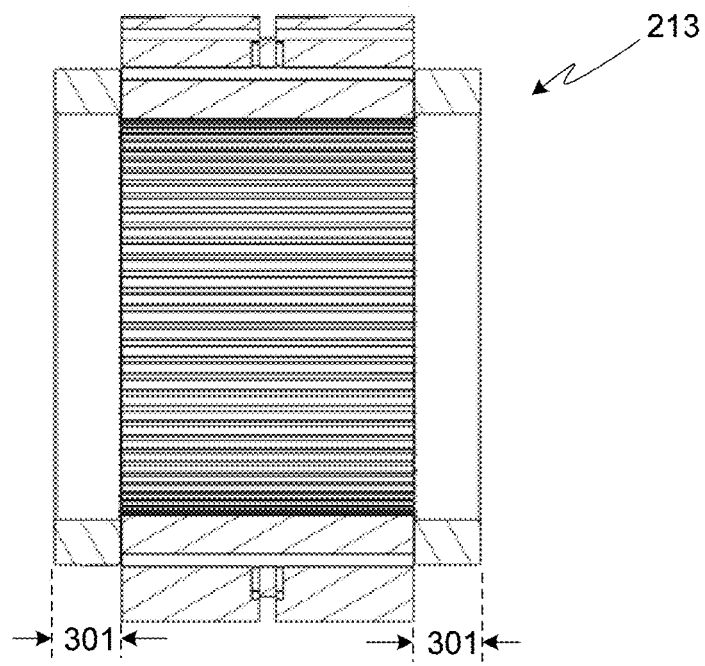
FIG. 3 provides a more detailed cross-sectional view of the stator shown in FIG. 2.
Figure 4:
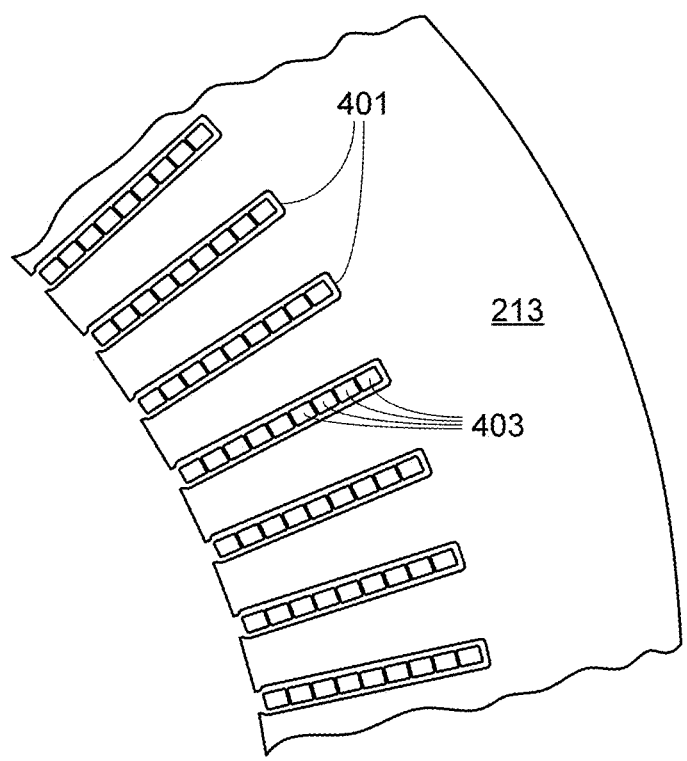
FIG. 4 provides a cross-sectional view of a portion of the stator, where the view provided by FIG. 4 is orthogonal to the views shown in FIGS. 2 and 3.

Surrounding the rotor lamination stack is stator 213. Visible in this view are the stator windings 215 that extend from either end of the stator. FIG. 3 provides a more detailed cross-sectional view of stator 213 than that provided by FIG. 2, while FIG. 4 provides an orthogonal cross-sectional view of a portion of stator 213. As shown in FIG. 4, the slots 401 within the stator 213 are filled with stator wire 403. Preferably and as shown, stator wire 403 has a rectangular cross-section. The use of rectangular stator wire rather than round stator wire reduces manufacturing tolerance variations. As a result, the amount that the stator windings extend out from either end of the stator, i.e., dimension 301, is less than that required when the stator wire has a circular cross-section. This, in turn, allows a further reduction in the overall width 201 of the powertrain assembly to be achieved.

Figure 5:
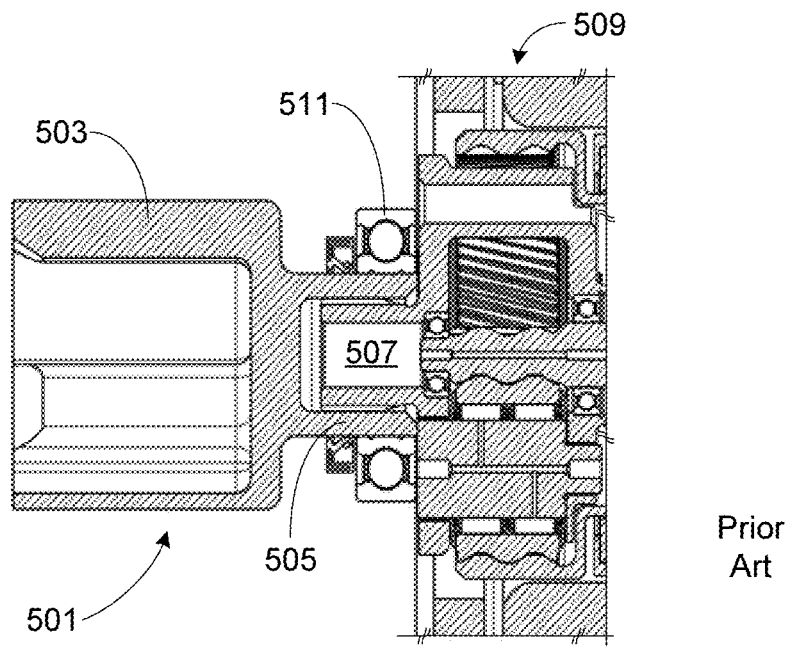
FIG. 5 illustrates the CV joint coupling to the planetary gear assembly in a conventional powertrain.

In a conventional PDP powertrain configuration such as the one illustrated in FIG. 5, the driven (i.e., powered) portion 501 of the CV joint includes the CV joint housing 503 and a mounting collar 505. Mounting collar 505 is coupled to the planetary gear output shaft 507 of the planetary gear assembly 509. CV mounting collar 505 is supported by a carrier bearing 511.

Figure 6:
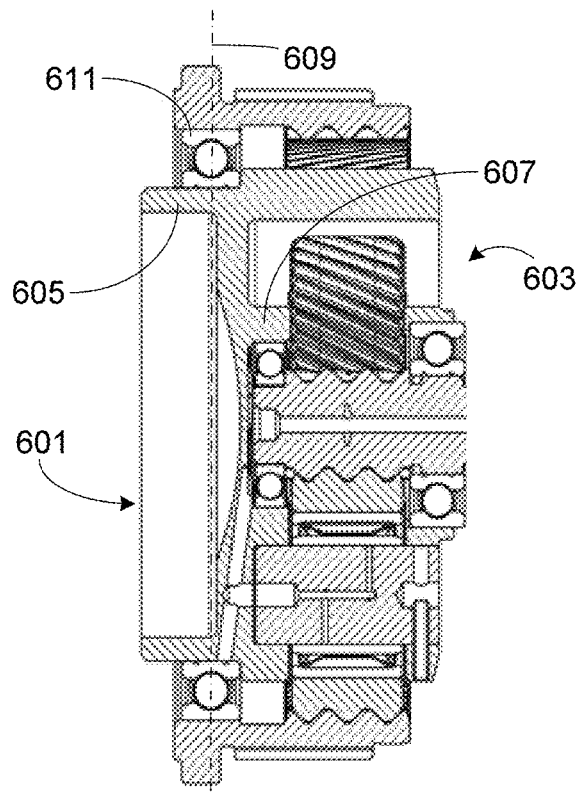
FIG. 6 illustrates the means used to couple the CV joint to the planetary gear assembly in the powertrain of the invention.
Figure 7:
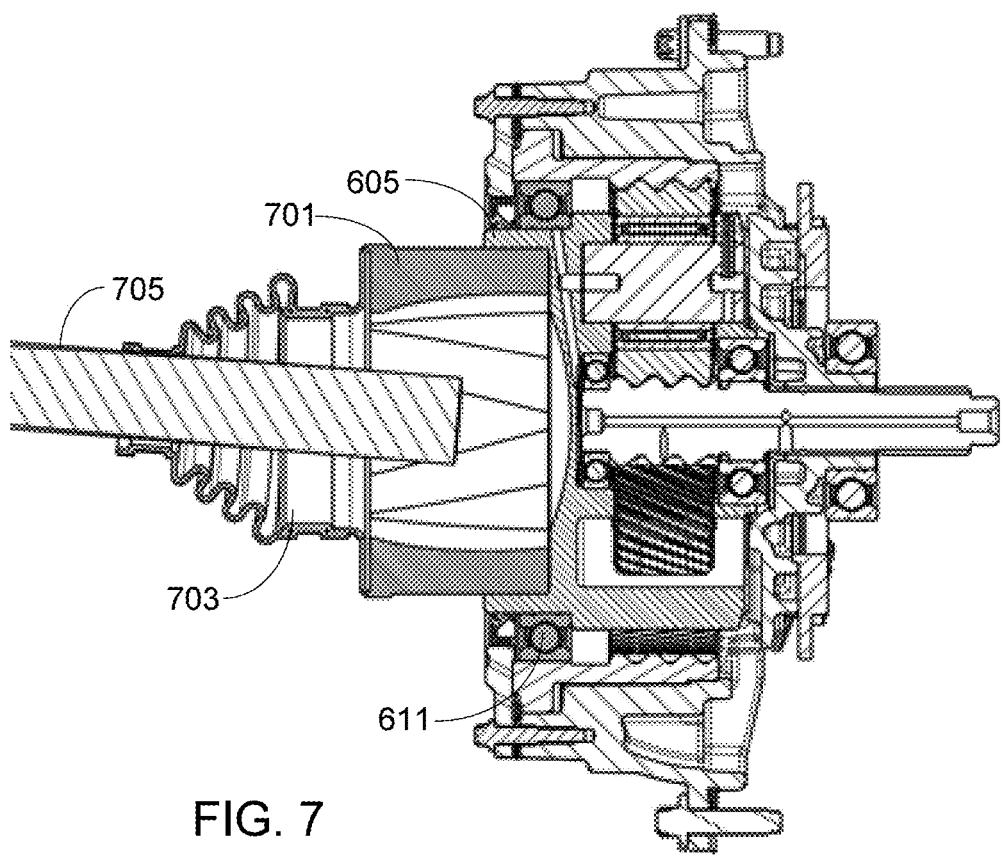
FIG. 7 provides a second cross-sectional view of the assembly illustrated in FIG. 6.

In contrast to the conventional means of supporting the CV joint, and as illustrated in FIGS. 2 and 6, the present invention utilizes a CV joint component 601 that is integrated into the planetary gear assembly 603. As shown, the CV joint component 601 includes both a CV joint housing member 605 that is integral to the CV joint component, and a plurality of planetary gear carrier members 607 that are integral to the planetary gear assembly. By making the planetary gear carrier integral to the CV joint, the overall width 201 of the powertrain assembly can be further decreased. Furthermore, as a result of this arrangement the CV joint housing member 605 can be configured to fall within the plane 609 defined by CV joint carrier bearing assembly 611 as shown. Thus this design decreases powertrain width while simultaneously providing improved CV joint support. FIG. 7 provides a second cross-sectional view of the assembly shown in FIG. 6, this view including a second CV joint housing member 701, CV joint boot 703, and output drive shaft 705.

Figure 8:
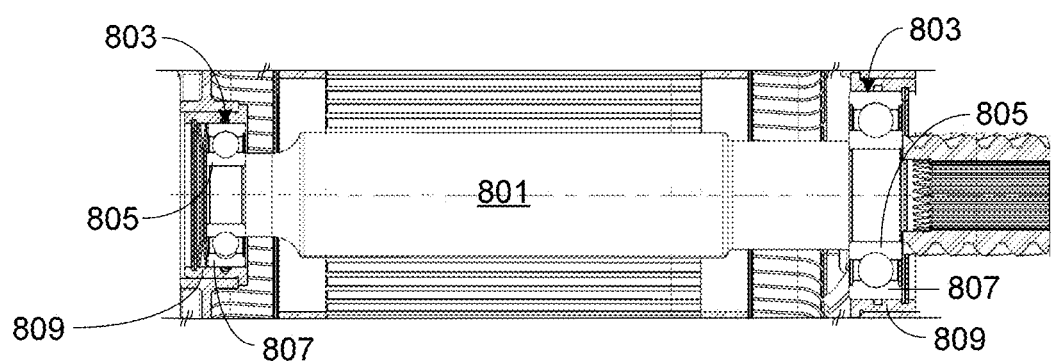
FIG. 8 illustrates a conventional rotor mounting configuration.

In a conventional non-active core electric motor, such as that illustrated in FIG. 8, the rotor shaft 801 is supported by a pair of carrier bearings 803. As shown, the inner race 805 of each bearing 803 is fixed to the rotor shaft while the outer race 807 is held stationary within housing members 809. Due to this arrangement, extra space is required to house the bearings, that additional space being axial, radial, or both. This arrangement can be especially problematic in an electric motor utilizing an active core, i.e., where the differential is constructed within the rotor shaft (see, for example, 2), since in this type of arrangement a relatively large, hollow rotor shaft is required. Additionally in an active core electric motor, this bearing arrangement limits the allowable rpm speed given the larger shaft size. To overcome these limitations and achieve a more compact powertrain, the present invention utilizes an inside-out bearing arrangement.

Referring to FIG. 2, assembly 200 mounts the rotor carrier bearings 217 inside the rotor shaft 207, rather than mounting the bearings to the exterior of the rotor shaft as in a conventional active core powertrain. This eliminates the need for additional volume to house the bearings where that volume impacts powertrain width 201. In this configuration it is the outer race 219 that is fixed to the rotor shaft and the inner race 221 that is stationary and fixed to housing member 223. In addition to minimizing, if not altogether eliminating, the impact of the rotor bearings on the powertrain width, this configuration also reduces the overall size of the bearings resulting in an increase in the allowable rpm speed.

Figure 9:
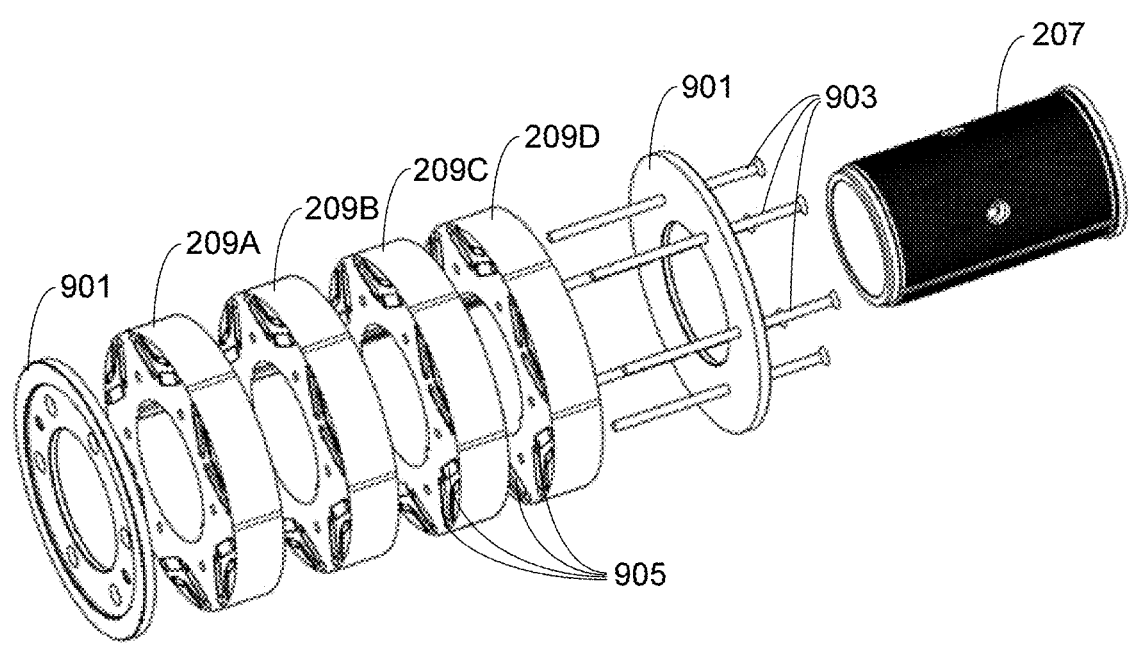
FIG. 9 provides a detailed perspective view of the rotor assembly of the powertrain shown in FIG. 2.

As an electric motor operates, and regardless of whether the motor has an active or non-active core, a variety of forces act on the rotor (e.g., centripetal force, reactive centrifugal force). These forces can be especially problematic in an active-core motor due to the size of the hollow rotor shaft within which is mounted the differential. To help minimize the effects of these forces on the rotor, and as illustrated in FIG. 9, preferably lamination layers 209A-209D are held between a pair of rotor assembly end plates 901. The entire rotor assembly, i.e., lamination layers 209A-209D and end plates 901, are clamped together using a plurality of axially mounted rivets 903. In addition, the preferred rotor assembly bonds the rotor magnets 905 to the corresponding lamination layers using a thermoset bonding agent. Rivets 903, especially when used in combination with the process of bonding the rotor magnets to the lamination layers, results in a very robust and rigid rotor assembly capable of handling the rotational speeds, temperatures and loads required of a high performance powertrain.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A powertrain assembly, comprising:
   an electric motor, said electric motor comprising:
      a hollow rotor shaft; and
      a rotor lamination stack containing a plurality of permanent magnets, wherein said rotor lamination stack encircles said hollow rotor shaft, and wherein said rotor lamination stack is attached directly to said hollow rotor shaft;
   a differential gear assembly mounted within said hollow rotor shaft, wherein a first output shaft coupled to said differential gear assembly exits said hollow rotor shaft from a first end of said hollow rotor shaft, wherein a second output shaft coupled to said differential gear assembly exits said hollow rotor shaft from a second end of said hollow rotor shaft, and wherein said second end of said hollow rotor shaft is distal from said first end of said hollow rotor shaft;
   a first planetary gear assembly coupled to said first output shaft, wherein said first planetary gear assembly is coaxially aligned with said hollow rotor shaft, said first planetary gear assembly comprising a first planetary gear carrier;
   a first constant velocity (CV) joint component, said first CV joint component further comprising a first CV joint housing member, wherein said first planetary gear carrier is integral to said first CV joint component;
   a second planetary gear assembly coupled to said second output shaft, wherein said second planetary gear assembly is coaxially aligned with said hollow rotor shaft, said second planetary gear assembly comprising a second planetary gear carrier; and
   a second CV joint component, said second CV joint component further comprising a second CV joint housing member, wherein said second planetary gear carrier is integral to said second CV joint component.

2. The powertrain assembly of claim 1, further comprising:
   a first CV joint carrier bearing assembly, wherein said first CV joint housing member is located within the plane defined by said first CV joint carrier bearing assembly; and
   a second CV joint carrier bearing assembly, wherein said second CV joint housing member is located within the plane defined by said second CV joint carrier bearing assembly.

3. The powertrain assembly of claim 1, said first planetary gear carrier comprising a first plurality of planetary gear carrier members extending from a rear surface of said first CV joint housing member, and said second planetary gear carrier comprising a second plurality of planetary gear carrier members extending from a rear surface of said second CV joint housing member.

4. The powertrain assembly of claim 1, further comprising:
- a first rotor carrier bearing mounted within a first portion of said hollow rotor shaft, wherein an outer bearing race of said first rotor carrier bearing is mounted to an inner rotor surface, wherein an inner bearing race of said first rotor carrier bearing is mounted to a first powertrain assembly housing member, and wherein said first powertrain assembly housing member extends into said hollow rotor shaft; and
- a second rotor carrier bearing mounted within a second portion of said hollow rotor shaft, wherein an outer bearing race of said second rotor carrier bearing is mounted to said inner rotor surface, wherein an inner bearing race of said second rotor carrier bearing is mounted to a second powertrain assembly housing member, and wherein said second powertrain assembly housing member extends into said hollow rotor shaft.

5. The powertrain assembly of claim 1, said electric motor further comprising a stator with a plurality of slots, wherein a plurality of windings occupy said plurality of slots, said plurality of windings comprised of stator wire with a rectangular cross-section.

6. The powertrain assembly of claim 1, said rotor lamination stack further comprising:
- a plurality of lamination layers; and
- a plurality of rivets, said plurality of lamination layers clamped together with said plurality of rivets.

7. The powertrain assembly of claim 6, said rotor lamination stack further comprising a first rotor assembly end plate and a second rotor assembly end plate, said plurality of lamination layers interposed between said first and second rotor assembly end plates, and wherein said plurality of rivets clamp together said first rotor assembly end plate, said plurality of lamination layers, and said second rotor assembly end plate.

8. A powertrain assembly, comprising:
- an electric motor, said electric motor comprising:
  - a hollow rotor shaft;
  - a rotor lamination stack containing a plurality of permanent magnets, wherein said rotor lamination stack encircles said hollow rotor shaft, and wherein said rotor lamination stack is attached directly to said hollow rotor shaft; and
  - a stator with a plurality of slots, wherein a plurality of windings occupy said plurality of slots;
- a differential gear assembly mounted within said hollow rotor shaft, wherein a first output shaft coupled to said differential gear assembly exits said hollow rotor shaft from a first end of said hollow rotor shaft, wherein a second output shaft coupled to said differential gear assembly exits said hollow rotor shaft from a second end of said hollow rotor shaft, and wherein said second end of said hollow rotor shaft is distal from said first end of said hollow rotor shaft;
- a first planetary gear assembly coupled to said first output shaft, wherein said first planetary gear assembly is coaxially aligned with said hollow rotor shaft;
- a first CV joint component, said first CV joint component further comprising a first CV joint housing member and a first plurality of planetary gear carrier members extending from a rear surface of said first CV joint housing member, wherein said first plurality of planetary gear carrier members correspond to said first planetary gear assembly;
- a first CV joint carrier bearing assembly, wherein a portion of said first CV joint component is located within the plane defined by said first CV joint carrier bearing assembly;
- a second planetary gear assembly coupled to said second output shaft, wherein said second planetary gear assembly is coaxially aligned with said hollow rotor shaft;
- a second CV joint component, said second CV joint component further comprising a second CV joint housing member and a second plurality of planetary gear carrier members extending from a rear surface of said second CV joint housing member, wherein said second plurality of planetary gear carrier members correspond to said second planetary gear assembly; and
- a second CV joint carrier bearing assembly, wherein a portion of said second CV joint component is located within the plane defined by said second CV joint carrier bearing assembly.

9. The powertrain assembly of claim 8, further comprising:
- a first rotor carrier bearing mounted within a first portion of said hollow rotor shaft, wherein an outer bearing race of said first rotor carrier bearing is coupled to an inner rotor surface, wherein an inner bearing race of said first rotor carrier bearing is coupled to a first powertrain assembly housing member, and wherein said first powertrain assembly housing member extends into said hollow rotor shaft; and
- a second rotor carrier bearing mounted within a second portion of said hollow rotor shaft, wherein an outer bearing race of said second rotor carrier bearing is coupled to said inner rotor surface, wherein an inner bearing race of said second rotor carrier bearing is coupled to a second powertrain assembly housing member, and wherein said second powertrain assembly housing member extends into said hollow rotor shaft.

10. The powertrain assembly of claim 8, said plurality of windings comprised of stator wire with a rectangular cross-section.

11. The powertrain assembly of claim 8, said rotor lamination stack further comprising:
- a plurality of lamination layers;
- a first rotor assembly end plate;
- a second rotor assembly end plate, said plurality of lamination layers interposed between said first and second rotor assembly end plates; and
- a plurality of rivets, wherein said plurality of rivets clamp together said first rotor assembly end plate, said plurality of lamination layers, and said second rotor assembly end plate.

* * * * *